United States Patent
Butler et al.

(10) Patent No.: US 9,841,556 B2
(45) Date of Patent: Dec. 12, 2017

(54) NON-CIRCULAR MULTICORE FIBER AND METHOD OF MANUFACTURE

(71) Applicant: Corning Incorporated, Corning, NY (US)

(72) Inventors: Douglas Llewellyn Butler, Painted Post, NY (US); Daniel Warren Hawtof, Corning, NY (US); Rick Charles Layton, III, Mansfield, PA (US); Gautam Meda, Corning, NY (US); John Stone, III, Painted Post, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/137,336

(22) Filed: Apr. 25, 2016

(65) Prior Publication Data

US 2016/0349447 A1 Dec. 1, 2016

Related U.S. Application Data

(60) Provisional application No. 62/168,125, filed on May 29, 2015.

(51) Int. Cl.
*G02B 6/02* (2006.01)
*C03B 37/012* (2006.01)
(Continued)

(52) U.S. Cl.
CPC .... *G02B 6/02042* (2013.01); *C03B 37/01205* (2013.01); *C03B 37/01222* (2013.01);
(Continued)

(58) Field of Classification Search
CPC ................. G02B 6/02; G02B 6/02042
(Continued)

(56) References Cited

U.S. PATENT DOCUMENTS

| 5,148,509 A | 9/1992 | Kannabiran |
| 5,152,818 A * | 10/1992 | Berkey ............ C03B 37/01217 385/126 |

(Continued)

FOREIGN PATENT DOCUMENTS

| EP | 89498 A1 | 9/1983 |
| EP | 215674 | 9/1993 |

(Continued)

OTHER PUBLICATIONS

Kokubun et al. "Dense Heterogeneous Uncoupled Multi-Core Fiber using 9 Types of Cores with Double Cladding Structure" 17th Microotics Conference (MOC' 11), Sendai, Japan, Oct. 30-Nov. 2, 2011; Paper K-5.

(Continued)

*Primary Examiner* — Kaveh C Kianni
(74) *Attorney, Agent, or Firm* — Robert L. Carlson

(57) ABSTRACT

A multicore fiber is provided. The multicore fiber includes a plurality of cores spaced apart from one another, and a cladding surrounding the plurality of cores and defining a substantially rectangular or cross-sectional shape having four corners. Each corner has a radius of curvature of less than 1000 microns. The multicore fiber may be drawn from a preform in a circular draw furnace in which a ratio of a maximum cross-sectional dimension of the preform to an inside diameter of the preform to an inside diameter of the draw furnace is greater than 0.60. The multicore fiber may have maxima reference surface.

14 Claims, 10 Drawing Sheets

(51) Int. Cl.
*C03B 37/027* (2006.01)
*C03B 37/029* (2006.01)

(52) U.S. Cl.
CPC .......... *C03B 37/027* (2013.01); *C03B 37/029* (2013.01); *C03B 2203/04* (2013.01); *C03B 2203/12* (2013.01); *C03B 2203/34* (2013.01)

(58) Field of Classification Search
USPC ........................................................ 385/126
See application file for complete search history.

(56) References Cited

U.S. PATENT DOCUMENTS

| | | | |
|---|---|---|---|
| 5,548,672 A | 8/1996 | Hattori et al. | |
| 5,748,820 A | 5/1998 | Le Marer | |
| 5,928,574 A * | 7/1999 | DiMarcello | B29D 11/00721 264/1.1 |
| 6,089,044 A | 7/2000 | Hardy | |
| 6,154,594 A | 11/2000 | Fiacco | |
| 6,192,713 B1 * | 2/2001 | Zhang | C03B 37/01807 65/388 |
| 6,473,555 B1 | 10/2002 | Kragl | |
| 6,539,151 B2 | 3/2003 | Fajardo | |
| 6,775,451 B1 | 8/2004 | Botelho et al. | |
| 6,849,333 B2 | 2/2005 | Schissel et al. | |
| 7,072,542 B2 | 7/2006 | Jenkins | |
| 7,346,250 B1 * | 3/2008 | Dabich, II | C03B 37/01208 385/115 |
| 9,120,693 B2 | 9/2015 | Hoover et al. | |
| 9,151,887 B2 | 10/2015 | Hoover et al. | |
| 9,594,211 B1 * | 3/2017 | Jain | G02B 6/028 |
| 2002/0044753 A1 * | 4/2002 | Nagayama | C03B 37/02718 385/123 |
| 2004/0114895 A1 * | 6/2004 | Okazaki | C03B 37/01217 385/123 |
| 2005/0072192 A1 * | 4/2005 | Arimondi | C03B 19/12 65/393 |
| 2009/0202211 A1 * | 8/2009 | Bickham | G02B 6/02333 385/125 |
| 2010/0290750 A1 | 11/2010 | Imamura | |
| 2011/0069725 A1 | 3/2011 | Shkunov | |
| 2011/0229086 A1 | 9/2011 | Bradley | |
| 2011/0274435 A1 | 11/2011 | Fini et al. | |
| 2012/0114292 A1 | 5/2012 | Hoover et al. | |
| 2012/0155805 A1 | 6/2012 | Doerr | |
| 2013/0008210 A1 * | 1/2013 | Chamorovskiy | C03B 37/01208 65/402 |

FOREIGN PATENT DOCUMENTS

| | | |
|---|---|---|
| EP | 611973 A1 | 8/1994 |
| EP | 703475 | 3/1996 |
| EP | 611973 B1 | 9/2001 |
| JP | 60154205 | 8/1985 |
| JP | 60225104 | 11/1985 |
| JP | 10148718 | 6/1998 |
| JP | 2003241038 | 8/2003 |
| JP | 2008242449 | 10/2008 |
| WO | 2012051362 | 4/2012 |

OTHER PUBLICATIONS

Rosinski et al., "Using VCSEL's and multicore fiber for multi-channel transmission," in Proc. IEEE LEOS Summer Top. Meeting-VCL, Montreal, PQ, Canada, Aug. 1997, pp. 59-60, paper WA4.

Watanabe et al. "Development of Fiber Bundle Type Fan-out for Multicore Fiber" 17th Opto-Electronics & Communications Conference (OECC 2012) Technical Digest. Jul. 2012, Busan, Korea; paper 5C1-2.

Roger H. Stolen, et al., "High-Birefringence Optical Fibers by Preform Deformation", Journal of Lightwave Technology, vol. LT-2, No. 5, Oct. 1984, pp. 639-641.

\* cited by examiner

NON-CIRCULAR MULTICORE FIBER AND METHOD OF MANUFACTURE

This application claims the benefit of priority under 35 U.S.C. §119 of U.S. Provisional Application Ser. No. 62/168,125 filed on May 29, 2015 the content of which is relied upon and incorporated herein by reference in its entirety.

BACKGROUND

This invention generally pertains to a multicore fiber that typically includes a cladding having a plurality of cores which allows for space division multiplexing (SDM) and enhanced signal carrying capacity, multiple spatial paths for data communication are constructed within a single transmission fiber. The multicore fiber is typically connected to a transceiver having transmitters and receivers at opposite ends of the fiber. Typically, the multicore fiber is formed in a generally circular shape which may result in drawbacks in aligning the individual cores to the signal paths in connecting devices. Accordingly, it is desirable to provide for a multicore fiber that offers alternative alignment and connectivity.

SUMMARY

In accordance with one embodiment, a method of forming a multicore fiber is provided. The method includes the step of forming a preform having a plurality of cores and cladding surrounding the cores, wherein the preform has a non-circular cross section with a plurality of corners and a maximum dimension across the cross section of the preform. The method also includes the step of inserting the preform in a draw furnace having a substantially circular cross section such that a ratio of the maximum dimension of the preform to an inside diameter of the draw furnace is greater than 0.60. The method further includes the step of drawing a multicore fiber from the preform to achieve a reduction in cross-sectional size as the fiber is drawn while substantially maintaining a non-circular cross-sectional shape and the plurality of corners of the preform.

In accordance with another embodiment, a multicore fiber is provided. The multicore fiber includes a plurality of cores spaced apart from one another in a N×M array wherein N and M≥2, and a cladding surrounding the plurality of cores and defining a substantially rectangular cross-sectional shape having four corners, wherein each corner has a radius of curvature less than 1000 microns.

In accordance with a further embodiment, a multicore fiber is provided that includes a plurality of cores spaced apart from one another, and a cladding surrounding the plurality of cores and defining a non-circular cross-sectional shape having at least four corners. The non-circular cross-sectional shape has a maxima structure located near each of at least two of the corners and reduced minima surfaces between the enlarged maxima structures to allow for alignment of the multicore fiber with an interconnecting device.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1:
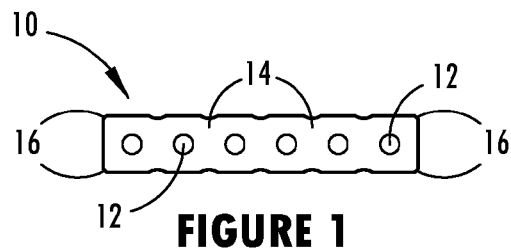
FIG. 1 is an end view of a rectangular multicore fiber having a linear array of six cores according to one embodiment.

Reference will now be made in detail to the present preferred embodiments, examples of which are illustrated in the accompanying drawings. Whenever possible, the same reference numerals will be used throughout the drawings to refer to the same or like parts.

The following detailed description represents embodiments that are intended to provide an overview or framework for understanding the nature and character of the claims. The accompanied drawings are included to provide a further understanding of the claims and constitute a part of the specification. The drawings illustrate various embodiments, and together with the descriptions serve to explain the principles and operations of these embodiments as claimed.

Figure 2:
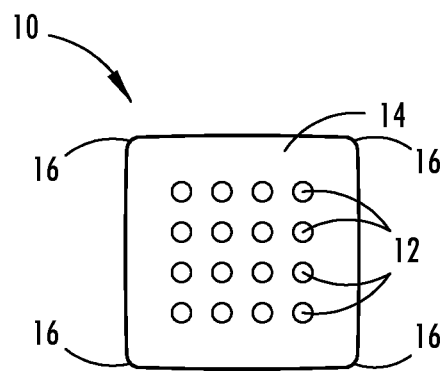
FIG. 2 is an end view of a multicore fiber having a generally square shape with sixteen cores shown in a two-dimensional 4×4 array according to another embodiment.
Figure 2A:
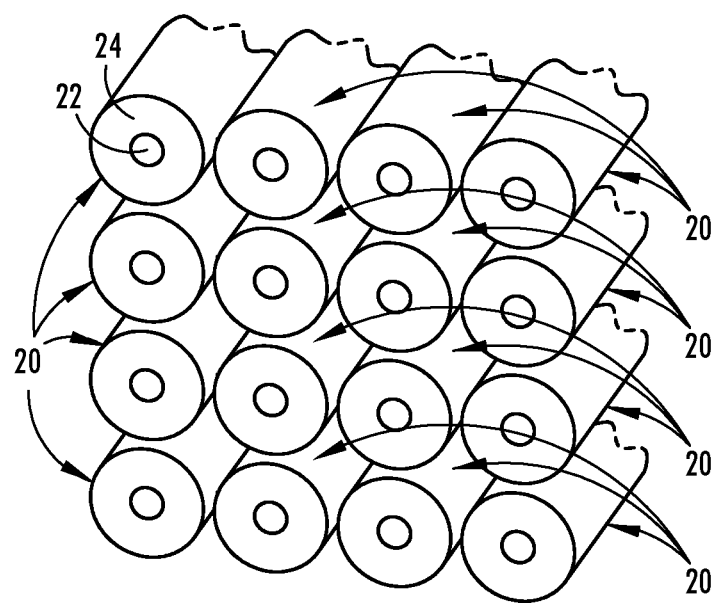
FIG. 2A is an end partial perspective view of a plurality of starting canes used to form a preform for forming the multicore fiber of FIG. 2.
Figure 2B:
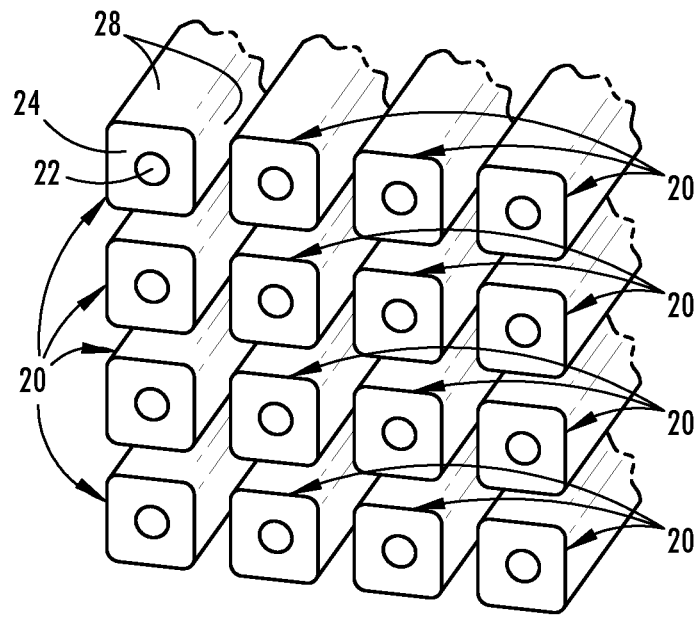
FIG. 2B is an end partial perspective view of the canes following the step of machining flat side walls on each cane.
Figure 2C:
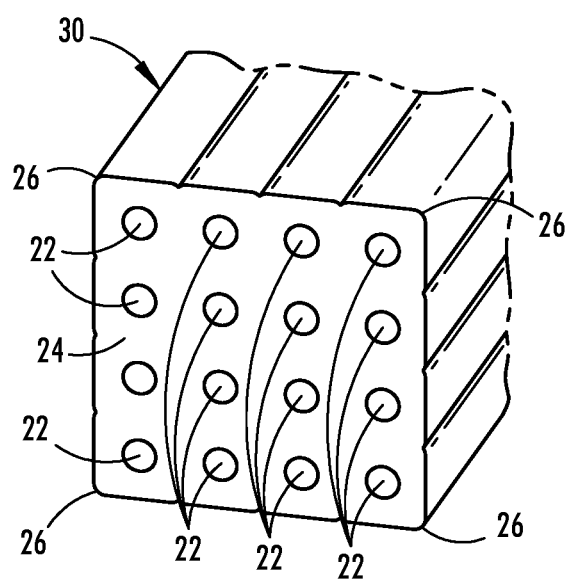
FIG. 2C is an end partial perspective view of a preform formed by consolidating the canes shown in FIG. 2B which is used to form the multicore fiber of FIG. 2.

Referring to FIGS. 1-2C, the terminal end of a bare (uncoated) multicore fiber 10 having a non-circular cross-sectional shape is illustrated, according to first and second embodiments. The multicore fiber 10 illustrated in FIG. 1 is a linear array embodiment having a plurality of glass cores 12 arranged in a 1×N array and surrounded by a glass cladding 14 and having a generally rectangular cross-sectional shape. In this example, a linear array of six cores 12 are illustrated, each spaced apart from one another and separated by the cladding 14. The multicore fiber 10 illustrated in FIG. 2 is a two-dimensional array embodiment having a plurality of cores 12 arranged in an N×M array and surrounded by a cladding 14 and having a generally square cross-sectional shape. In this example, the N×M array is a 4×4 array of sixteen cores 12, each spaced apart from one another and separated by the cladding 14. It should be appreciated that the multicore fiber 10 may have any number of two or more cores 12.

The multicore fiber 10 employs a plurality of glass cores spaced from one another and surrounded by a cladding having a shape that is non-circular in cross section. The cores and cladding may be made of glass or other optical fiber material and may be doped suitable for optical fiber. In one embodiment, the shape of the multicore fiber 10 may be a rectangular cross-sectional shape as shown in FIG. 1. In another embodiment, the shape may be a square cross-sectional shape as shown in FIG. 2. According to other embodiments, other non-circular cross-sectional shapes and sizes may be employed including hexagonal and various polygonal forms. The multicore fiber 10 employs a plurality of cores, each capable of communicating light signals between transceivers including transmitters and receivers which may allow for parallel processing of multiple signals. The multicore fiber 10 may be used for wavelength division multiplexing (WDM) or multi-level logic or for other parallel optics of spatial division multiplexing. The multicore fiber 10 may advantageously be aligned with and connected to the various devices in a manner that allows for easy and reliable connection so that the plurality of cores 12 are accurately aligned at opposite ends with light communication paths in connecting devices.

The multicore fiber 10 is produced by drawing a preform having a plurality of cores and cladding configured in a shape similar to the shape of the resulting fiber that is drawn therefrom. In the embodiment shown in FIGS. 1-2C, the multicore fiber 10 has a plurality of cores 12 spaced apart from one another and a cladding 14 surrounding the plurality of cores and defining a substantially rectangular or square cross-sectional shape having four approximately right angle, i.e., ninety degree (90°) corners 16 that are relatively sharp. Each corner 16 has a radius of curvature of less than 1000 microns, according to one embodiment. More specifically, the radius of curvature of each of the corners 16 is less than 500 microns, and more preferably less than 250 microns, and most preferably less than 10 microns. The rectangular cross-sectional shape may have two pairs of unequal side walls or may be a substantially square cross-sectional shape with two pairs of equal side walls having a two-dimensional array of cores 12 aligned in rows and columns as shown in FIG. 2. The non-circular shape of the multicore fiber 10 includes substantially flat surfaces, such as the four lateral outside walls defining the cross-sectional circumference of the fiber 10 which allows for the orientation and alignment of the fiber 10 with a connecting device, such that the cores 12 accurately align with light communication paths in the connecting device. The flat surfaces thereby serve as reference surfaces for alignment purposes to align and connect the multicore fiber 10 to a connecting device. In addition, the multicore fiber 10 may include one or more additional cores (not shown) that may serve as an alignment core to align the cores 12 with communication paths presented with the connecting device at one or both ends of the fiber 10.

Figure 1A:
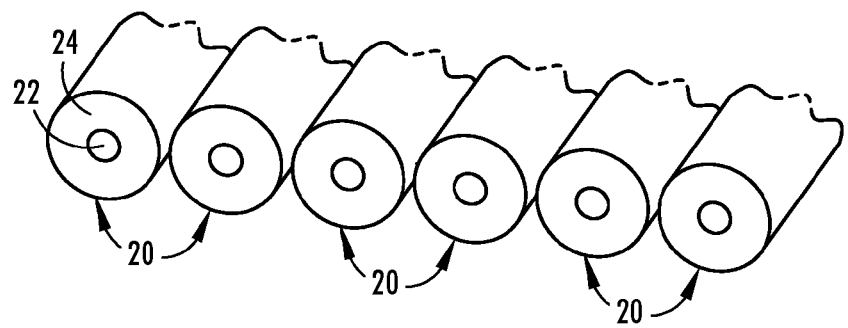
FIG. 1A is an end partial perspective view of a plurality of starting canes used to form a preform for forming the multicore fiber of FIG. 1.
Figure 1B:
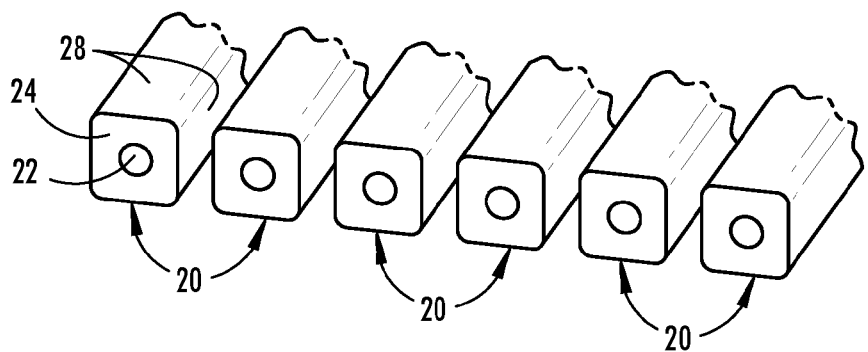
FIG. 1B is an end partial perspective view of the canes following the step of machining flat side walls into a generally square shape.
Figure 1C:
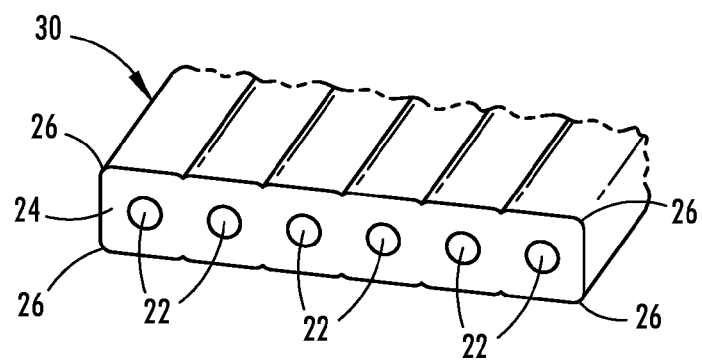
FIG. 1C is an end partial perspective view of a preform formed after consolidating the canes shown in FIG. 1B which is used for forming the multicore fiber of FIG. 1.

In the embodiment shown in FIGS. 1-1C, the linear array configuration of the multicore fiber 10 has six cores 12 linearly spaced from one another and surrounded by cladding 14. The spacing between the cores 12 may be 20 to 200 microns, according to one embodiment. The core-to-core spacing between cores varies by less than 1 micron, and preferably less than 0.2 microns. The multicore fiber 10 has four generally flat surfaces around the circumference of the end view. One or more of the generally flat surfaces serves as a reference surface to orient and align the fiber 10 and its multiple cores 12 with a connecting device. Each of the four corners 16 has a radius of curvature that is sufficiently small so as to provide a generally sharp corner. In one embodiment, the radius of curvature of each corner 16 is less than 1000 microns, preferably less than 500 microns, more preferably less than 250 microns, and most preferably less than 10 microns. The multicore fiber 10 may have a width of 240 microns, a height of 40 microns, and may extend a length of in the range of 10 cm to several hundred kilometers. The multicore fiber 10 may be formed in a draw furnace by employing a preform having a much larger size in height and width and similar shape and is drawn according to a process that maintains the non-circular cross-sectional shape of the fiber 10 and the shape of each of the plurality of corners 16.

A method of forming a preform that is used to form the multicore fiber 10 of FIG. 1 is illustrated in FIGS. 1A-1C. In FIG. 1A, a plurality of generally cylindrical starting canes 20 are provided. The glass canes 20 may be constructed of any glass or other optical fiber material and may be doped suitable for the manufacture of optical fiber. Each cane 20 has a cylindrical glass core 22 and a surrounding cladding 24. The glass core 22 may be formed of Germania doped silica or other suitable glass. The cladding 14 may be formed of silica or fluorine doped silica or other suitable glass. The canes 20 may each have a starting minimum diameter of 25 millimeters and a minimum core diameter size of 8 microns, according to one embodiment. The length of the canes 20 may be 1 meter or greater. Each of the starting canes 20 is processed to form one or more flat outer surfaces 28. As seen in FIG. 1B, four flat outer surfaces 28 are formed as square defining side walls in each of the canes 20 such that the cane 20 has a square cross section. The flat surfaces 28 may be formed by machining the cylindrical canes into a square cross-sectional shape having four relatively sharp approximately right angle corners each having a radius of curvature of less than 1000 microns, and preferably less than 500 microns, more preferably less than 250 microns, and more preferably less than 10 microns. The individual square shaped canes 20 are then stacked together side-by-side in a linear array and accurately aligned and consolidated together to form the preform 30 as shown in FIG. 1C. The consolidation may include heating both ends of the machined canes 20 with a hand torch or other heater to melt the individual canes 20 together. Optionally, a redraw handle may be attached to the preform 30. The preform 30 may be redrawn in a two-step process of down driving the preform at 15 millimeters per minute at 2000° furnace temperature to bond the glass together, increased to 20 millimeters per minute at temperatures of 1900° C. down to 1850° C. In addition, the preform 30 may be twisted as redrawn to enable a skew in the drawn fiber of greater than one rotation per 100 kilometers. The preform 30 may be returned to the top of the hot zone of the draw furnace and redrawn at a temperature of about 2150° C., twisting the cane assembly together, and down feeding the preform at 10 millimeters per minute at 2000° C. to 1820 millimeters square canes. In one example, a 7 inch (17.78 cm) inside diameter consolidation furnace may be used to heat the preform to consolidate it together. The preform may be the down driven at 5 to 15 millimeters per minute through 1490° C. to 1550° C. in the hot zone of the draw furnace. The preform 30 is heated in the draw furnace to melt the glass and draw the bare optical fiber 10 shown in FIG. 1. The bare optical fiber 10 may also be coated.

The square multicore fiber 10 illustrated in FIG. 2 is formed to include a two-dimensional N×M array of cores 12 each separated by a distance and surrounded by cladding 14, where N and M are greater than or equal to 2. The distance between the cores 12 within each row and column may be in the range of 20 to 200 microns. The multicore fiber 10 shown in FIG. 2 has four approximately right angle ninety degree (90°) corners 16 each having a radius of curvature less than 1000 microns, more preferably less than 500 microns, more preferably less than 250 microns, and most preferably less than 10 microns. As a result, the square configuration of the multicore fiber 10 has relatively sharp corners 16. The square multicore fiber 10 may have a width of 125, a height of 125, and may extend a length of in the range of 10 cm to hundreds of kilometers.

The multicore fiber 10 of FIG. 2 is formed by drawing the fiber 10 from a preform 30 which is shown formed in FIGS. 2A-2C. In FIG. 2A, a plurality of cylindrical starting canes 20 are illustrated, each having a cylindrical glass core 22 and a surrounding glass cladding 24. Each cane 20 may have a minimum width of 25 millimeters in diameter, a minimum core diameter of 8 microns, and a length of 1 meter or more. In all, sixteen canes are arranged in a two-dimensional 4×4 array. Each of the sixteen canes 24 are processed to include at least one flat surface, and more particularly to include four flat surfaces 28 defining a square shape as shown in FIG. 2B. The four flat surfaces 28 provided on each cane 20 may be formed by machining the cylindrical wall to form a square cross-sectional shape having four generally sharp corners 26. The plurality of machined canes 20 are aligned in a 4×4 array as seen in FIG. 2B and then stacked together and consolidated to form a preform 30 as shown in FIG. 2C. The preform 30 may be consolidated by heating both ends of the canes 20 with a hand torch or other heater to melt the individual canes 20 together and by redrawing the preform in the two-step process as described above in connection with the linear array preform shown in FIG. 1C. As a result, the preform 30 shown in FIG. 2C has a non-circular cross-sectional shape shown as a square shape having four substantially flat outer side walls and four sharp corners 26 that define the square shape. Each corner 26 has a radius of curvature less than 1000 microns, and more preferably less than 500 microns, more preferably less than 250 microns, and most preferably less than 10 microns. The preform 30 is then inserted into a draw furnace and used to draw the multicore fiber 10 shown in FIG. 2.

Figure 3:
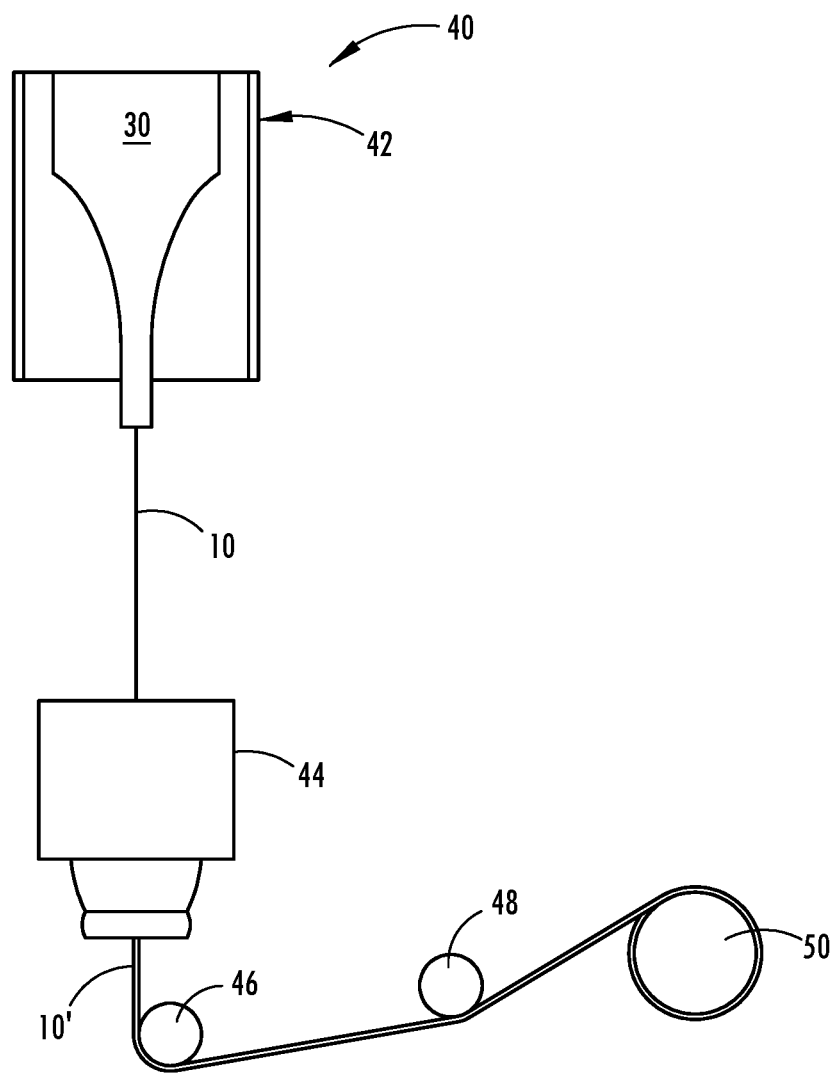
FIG. 3 is a schematic diagram illustrating an optical fiber production system useful for forming the multicore fiber.

Referring to FIG. 3, an optical fiber production system 40 is generally shown, according to one embodiment. The optical fiber production system 40 includes a draw furnace 42 that may be heated to a temperature of about 2000° C. The glass optical fiber preform 30 is placed in the draw furnace 42 and the multicore fiber 10 is heated and drawn therefrom, as shown by the bare optical fiber 10 output exiting the bottom of the furnace 42. Once the bare optical fiber 10 is drawn from the preform 30, the bare optical fiber 10 may be cooled as it exits the bottom of draw furnace 42. After sufficient cooling, the bare optical fiber 10 may be subjected to a coating unit 44 where a primary protective coating layer is applied to the outer surface of the bare optical fiber 10. After leaving the coating unit 44, the coated optical fiber 10' with a protective layer can pass through a variety of processing stages within the production system 40 such as tractors or rollers 46 and 48 and onto a fiber storage spool 50. One of the rollers 46 or 48 may be used to provide the necessary tension in the optical fiber as it is drawn through the entire system and eventually wound onto the storage spool 50.

The preform 30 is used to draw the multicore fiber 10 such that the preform 30 shown in FIG. 1C is redrawn into the fiber 10 as shown in FIG. 1 and the preform 30 of FIG. 2C is redrawn into the fiber 10 shown in FIG. 2. In doing so, the preform 30 is inserted in a cylindrical draw furnace which may have a substantially circular cross-sectional shape on the inside surface and is heated to a temperature to melt the preform 30 and draw the multicore fiber from the preform to achieve a reduction in cross-sectional size as the fiber is drawn while substantially maintaining the non-circular cross-sectional shape and the plurality of corners of the preform. The draw process may include drawing the multicore fiber 10 at a draw tension of greater than 100 grams to enable the square or rectangular geometry and the plurality of corners to maintain their shape. According to one embodiment, the multicore fiber 10 is drawn at a draw tension in the range of 100 grams to 300 grams, and more preferably in the range of 150 grams to 300 grams. The multicore fiber 10 may be drawn at a peak draw furnace temperature ranging between 1900° C. and 2150° C. It should be appreciated that the linear and two-dimensional embodiments of the multicore fiber 10 may be formed using the preforms shown in FIGS. 1C and 2C and inserted into the draw furnace 40 of the fiber production system 40 to form the multicore fiber 10 shown in FIGS. 1 and 2, respectively.

Figure 4:
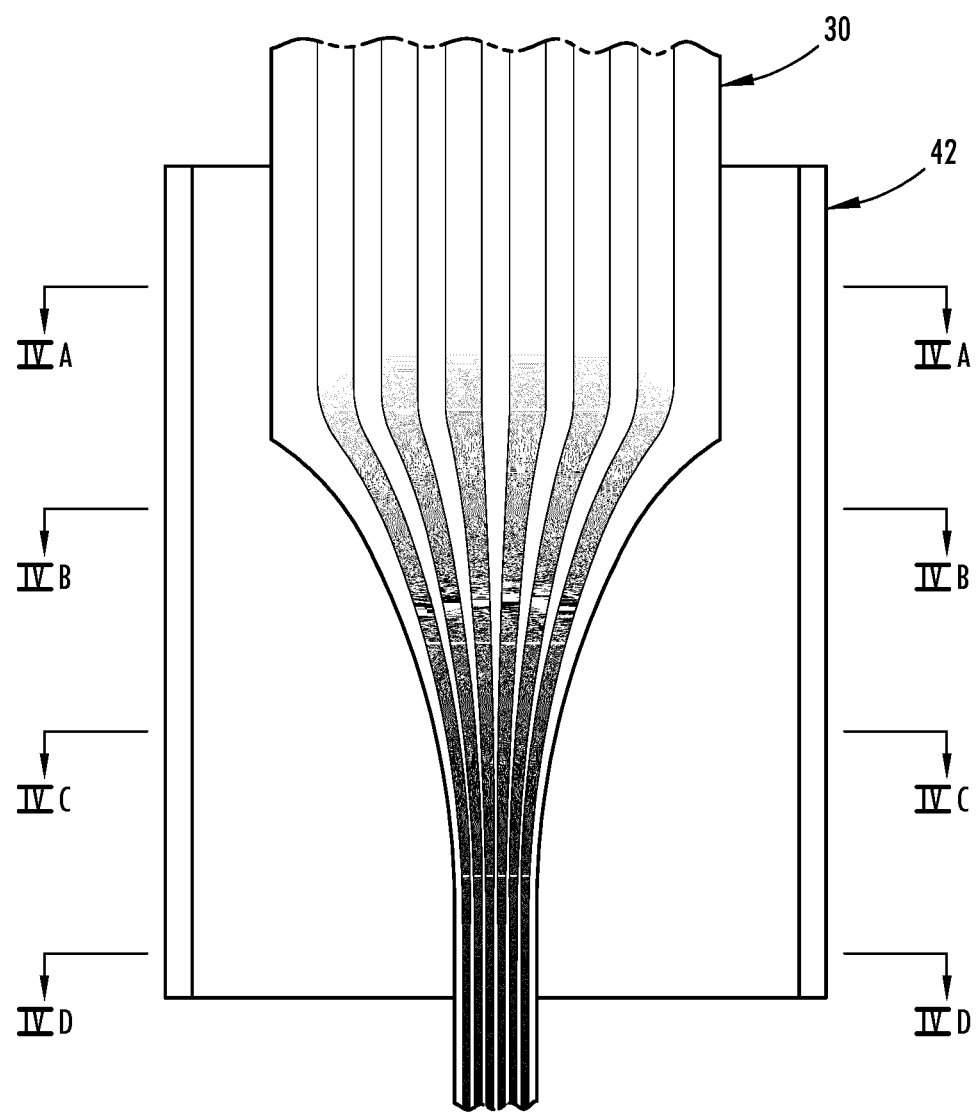
FIG. 4 is a cross-sectional view of the cylindrical draw furnace containing a preform for forming the multicore fiber, according to one embodiment.
Figure 5:
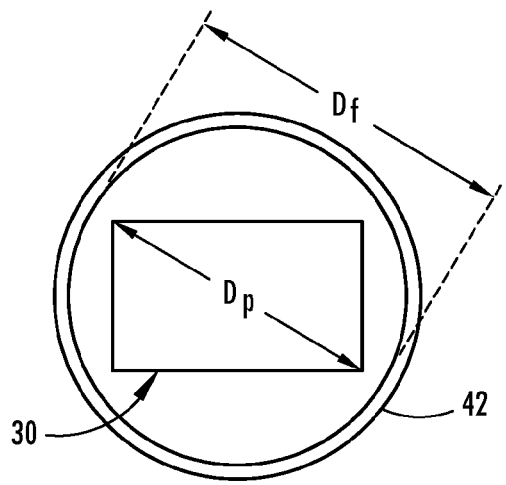
FIG. 5 is a top view of the preform in the draw furnace illustrating relative dimensions.

Referring to FIGS. 4-5, the preform 30 is illustrated disposed in the draw furnace 42 during the fiber draw process. The draw furnace 42 has a substantially circular cross section with circular inside diameter $D_f$. The inside diameter $D_f$ of the draw furnace may range from 3 to 12 inches (7.62-30.48 cm) according to one embodiment, and may be approximately 7 inches (17.78 cm), according to one specific example. The preform 30 has a non-circular cross section with a plurality of corners as described herein. The non-circular cross section of the preform 30 may be a rectangular cross section or a square cross section having four corners 26. The preform 30 has a maximum dimension $D_p$ across the cross section of the preform 30 as seen in FIG. 5. The maximum dimension of a rectangular or square preform is defined by the diagonal line extending between opposite corners. The preform 30 is inserted into the draw furnace 42 and may be heated to a temperature of approximately 2000° C. The heat generated by the draw furnace causes the preform to melt and to draw the preform into the multicore fiber which is drawn from the bottom of the preform and exiting the bottom of the draw furnace 42.

Figure 4A:
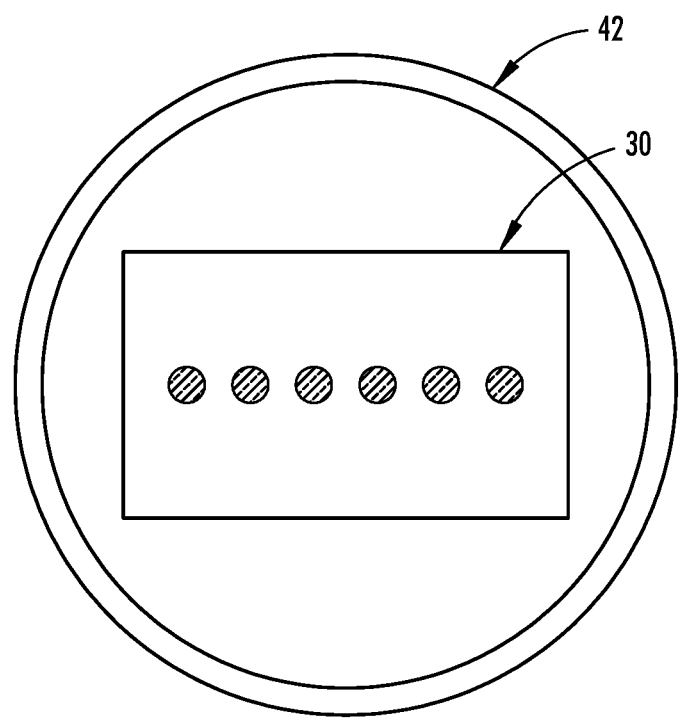
FIG. 4A is a cross-sectional view taken through line IVA-IVA of FIG. 4 showing the preform relative to the furnace in an upper draw furnace position.
Figure 4B:
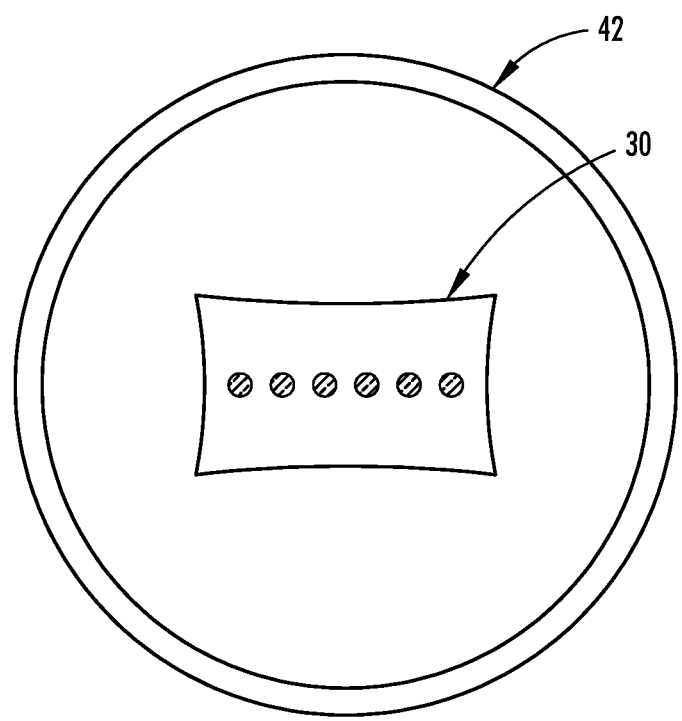
FIG. 4B is a cross-sectional view taken through line IVB-IVB of FIG. 4 further illustrating the preform shape at a lower position within the draw furnace.
Figure 4C:
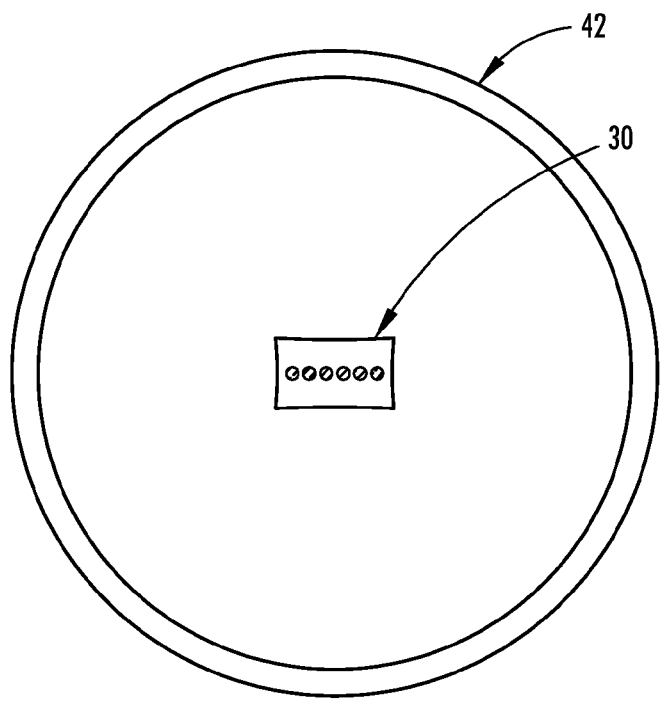
FIG. 4C is a cross-sectional view taken through line IVC-IVC of FIG. 4 illustrating the preform at yet a lower position within the draw furnace.
Figure 4D:
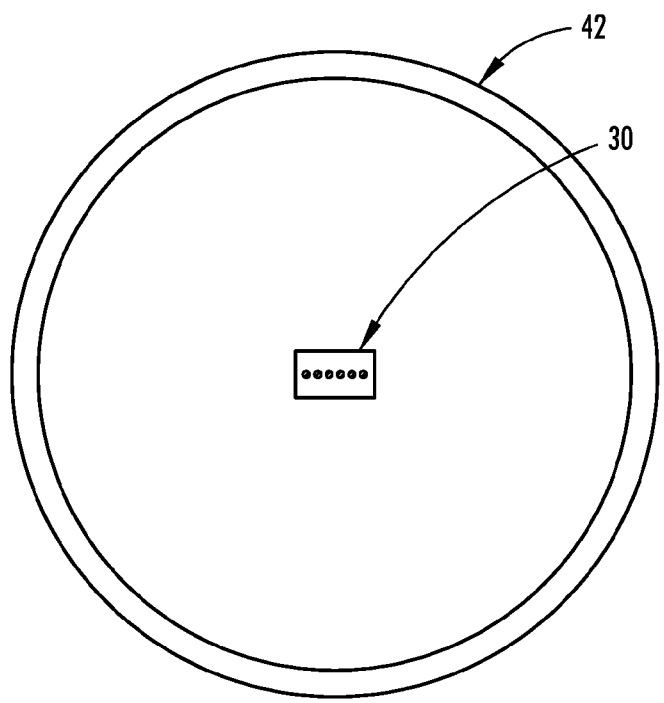
FIG. 4D is a cross-sectional view taken through line IVD-IVD of FIG. 4 further illustrating the preform at yet a lower position within the draw furnace.

The relative dimensions of the preform 30 to the inside diameter of the furnace 42 are illustrated near the top of the furnace 42 in FIG. 4A and FIG. 5. FIGS. 4B-4D illustrate the preform 30 at lower portions of the furnace as the multicore fiber is drawn from the draw furnace 42. Initially, near the top of the draw furnace 42, the maximum cross-sectional dimension of the preform 30 is shown by dimension $D_p$ as a diagonal between opposite corners of the rectangular preform. The inside diameter of the draw furnace 42 is shown by line $D_f$ and the preform 30 is preferably central within the draw furnace 42. The ratio of maximum dimension $D_p$ of the preform 30 to the inside diameter $D_f$ of the draw furnace 42 is greater than 0.60, more preferably greater than 0.70, more preferably greater than 0.80, more preferably greater than 0.90, and more preferably greater than 0.95.

The square or rectangular preform 30 when drawn at the high temperatures in the draw furnace can undergo rounding of the corners or edges due to the surface energy driven viscous flow restructuring. The degree of rounding of the edges can be described by a non-dimensional draw parameter X which is the ratio of the residence time and the characteristic time of restructuring, and may be represented by the following equation:

$$X = \left( \frac{\text{length of hot zone} \times \text{surface tension}}{\text{draw speed} \times \text{glass viscosity} \times \text{maximum cross-sectional dimension } Dp} \right).$$

The glass surface tension may be calculated using the following relationship: surface tension (in dynes/centimeter) $=233.28+0.35 \times T_{peak}$, where $T_{peak}$ is the peak temperature in Kelvin at the draw. The glass viscosity may be calculated using the following relationship: glass viscosity (in Poise) $=\text{Exp}[-13.738+(60604.7/T_{peak})]$. In some embodiments, the preform may have an acceptable rounding of the edges when drawn under conditions corresponding to the draw parameter X having values preferably less than $5 \times 10^{-6}$, more preferably less than $2 \times 10^{-6}$, and even more preferably less than $1 \times 10^{-6}$. By employing a non-circular preform 30 such as a rectangular or square preform having corners and defining a maximum dimension of a size sufficiently large enough such that the corners are near the inner walls of the draw furnace 42 results in a heat distribution that melts the preform in a manner that maintains the shape of the preform, particularly the corners of the preform, as it is drawn into the multicore fiber 10. As a result, the preform does not undergo excessive rounding of the corners as it transitions to the fiber such that the resulting multicore fiber 10 has a substantially similar shape to the shape of the preform 30.

In accordance with another embodiment, the multicore fiber is drawn at a draw speed of $V_{draw}$ from a preform having maximum cross section dimension $D_p$ in a draw furnace having peak temperature in Kelvin of $T_{peak}$ and hot zone length of $L_{draw}$ under conditions that result in non-dimensional draw parameter $X=(L_{draw} \times \sigma)/(V_{draw} \times \mu \times D_p)$ to be less than $5 \times 10^{-6}$; wherein $\sigma$ is the glass surface tension defined as $\sigma$ (dynes/cm)$=233.28+0.035 \times T_{peak}$ and $\mu$ is the glass viscosity defined as $\mu$ (Poise)$=\text{Exp}[-13.738+(60604.7/T_{peak})]$. In another embodiment, the multi-core fiber is drawn under process conditions corresponding to the non-dimensional draw parameter of less than $2 \times 10^{-6}$. In yet another embodiment, the multi-core fiber is drawn under process conditions corresponding to the non-dimensional draw parameter of less than $1 \times 10^{-6}$.

The preform 30 starts out with the largest maximum dimension $D_p$ near the top of the draw furnace 42 and maintains the cross-sectional size up until the furnace 42 melts the glass and draws the glass downward in an approximately tapered shape as shown in FIG. 4. As the glass melts and begins to taper at a lowered position within the furnace 42 shown by cross section IVB-IVB of FIG. 4B, the width and height dimensions of the preform 30 are reduced and the four side walls are generally shown having a slight concave curvature with the corners being substantially sharp as shown in FIG. 4B. As the preform 30 further is drawn into the furnace 40 to the lower position shown in FIG. 4C, the width and height dimensions of the preform 30 are further reduced and the corners remain relatively sharp. As the preform 30 is drawn further into the draw furnace 42 to the position shown in FIG. 4D, the height and width of the preform 30 are further reduced and the four walls are shown substantially straight and the four corners are relatively sharp. The final drawn multicore fiber 10 resulting from drawing the preform 30 is shown in FIG. 1 having four substantially flat surfaces defining a rectangular cross-sectional shape and four sharp corners 16. The multicore fiber 10 may have slight dimples in the side walls as seen in FIG. 1 which are the result of multiple canes used to form the preform. It should be appreciated that the preform 30 shown in FIG. 2C may likewise be placed in the draw furnace 42 and heated to draw the multicore fiber 10 shown in FIG. 2 which similarly maintains its shape with flat surfaces and sharp corners.

As a result, a method of forming a multicore fiber 10 is provided that includes the step of forming a preform 30 having a plurality of cores 12 and cladding 14 surrounding the cores, wherein the preform has a non-circular cross section with a plurality of corners and a maximum dimension across the cross section of the preform. The method includes the step of inserting the preform in the draw furnace 42 having a substantially circular cross section, such that a ratio of the maximum dimension $D_p$ of the preform to an inside diameter of the draw furnace $D_f$ is greater than 0.60. The method further includes the step of drawing a multicore fiber 10 from the preform to achieve a reduction in cross-sectional size as the fiber is drawn while substantially maintaining a non-circular cross-sectional shape and the plurality of corners of the preform. The maximum dimension of the preform to the inside diameter of the draw furnace is greater than 0.60, preferably greater than 0.70, preferably greater than 0.80, more preferably greater than 0.90, and most preferably greater than 0.95.

Figure 6:
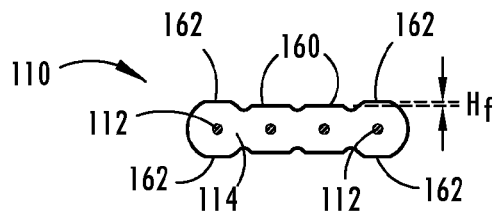
FIG. 6 is an end view of a multicore fiber having a linear array of cores and maxima reference surfaces formed near opposite ends.
Figure 7:
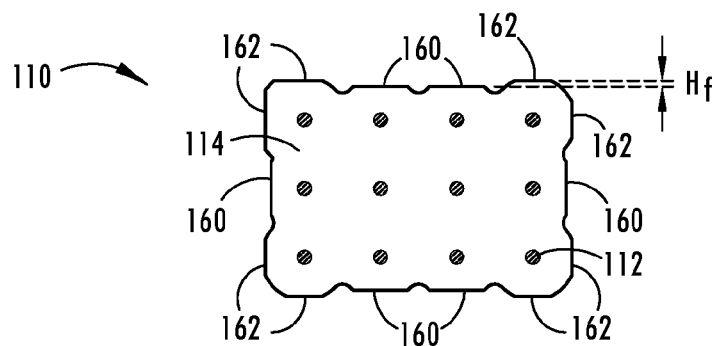
FIG. 7 is an end view of a multicore fiber having a rectangular two-dimensional array of cores and maxima reference surfaces near the corners, according to a further embodiment.
Figure 8:
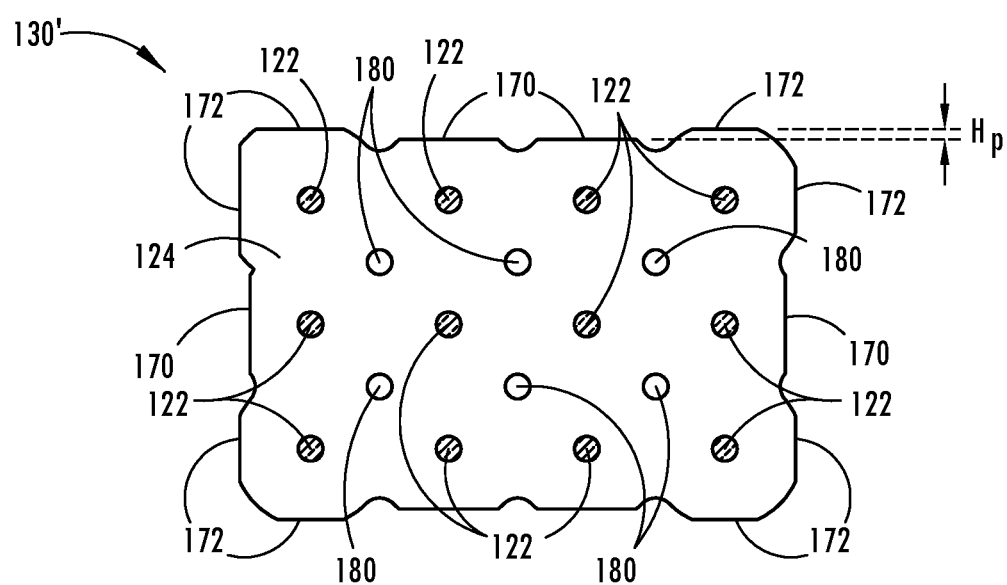
FIG. 8 is an end view of a multicore preform containing a plurality of openings that results in air channels in the drawn multicore fiber, according to yet a further embodiment.

Referring to FIGS. 6-8, a bare multicore fiber 110 and the formation of a preform 130 for forming the bare multicore fiber 110 having maxima reference surfaces and minima surfaces is illustrated according to both a linear array embodiment and a two-dimensional array embodiment. The multicore fiber 110 illustrated in FIG. 6 is a linear array embodiment having a plurality of cores 12 arranged in a 1×N and surrounded by a cladding 14. In this example, the linear array includes six cores 12 each spaced from one another and separated by the cladding 14. The left and right side of the end of the multicore fiber 110 are shown having a generally rounded surface in this embodiment. The top and bottom sides of the multicore fiber 110 each have flat surfaces that define maxima surfaces 162 and minima surfaces 160 located between the maxima surfaces 162 on opposite the ends. The maxima surfaces 160 have an extended height greater than the minima surfaces by height $H_f$. The maxima surfaces 162 are located on opposite side of the fiber preferably near the corners and serve as reference structures for orienting the multicore fiber 110 into proper alignment with a connecting device. It should be appreciated that the cladding 114 surrounding the plurality of cores 112 defines a non-circular cross-sectional shape and that the multicore fiber 110 generally has four corners which are generally shown as rounded in this embodiment. The maxima surface structures 162 are located near each of at least two of the corners or the left and right ends of the fiber and the reduced height minima surface structures 160 are located between the enlarged maxima structures 162 to allow for accurate alignment of the multicore fiber with an interconnecting device. As such, the multicore fiber 110 will rest against the ground or other surface by making contact with maxima reference structures 162.

Figure 6A:
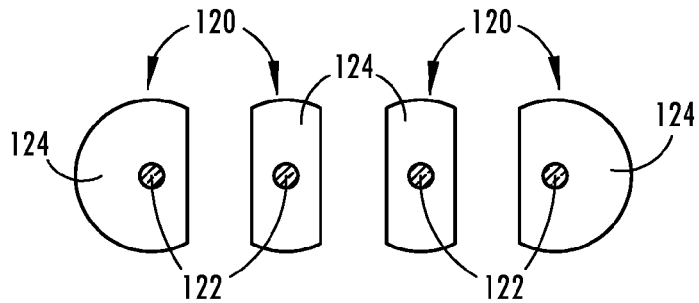
FIG. 6A is an exploded end view of a preform used to form the multicore fiber of FIG. 6 showing the machined canes and the assembly thereof.
Figure 6B:
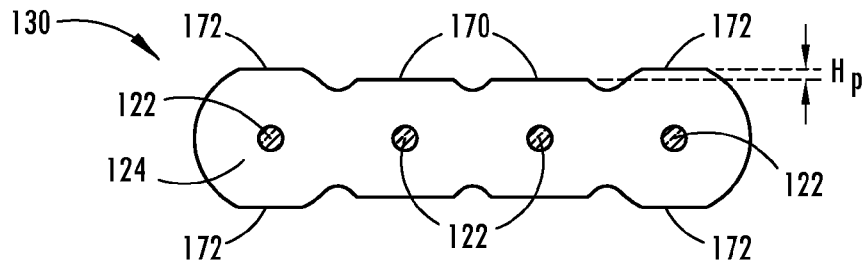
FIG. 6B further illustrates the preform of FIG. 6A following machining of the maxima and minima surfaces.

The multicore fiber 110 of FIG. 6 is formed from a preform 130 which is shown formed in FIGS. 6A and 6B. In FIG. 6A, a plurality of starting canes 120 are shown each having a glass core 122 and a cladding 124. The starting canes 120 may be cylindrical and may be machined to include one or more flat surfaces. In the embodiment shown, the left and right end canes are formed with one flat surface on the inner side and the middle two canes 120 are formed with left and right flat surfaces. The plurality of canes 120 are aligned and joined together and consolidated to form a preform as described above. Further, maxima surface structures 172 and minima surface structures 170 are machined into the top and bottom surfaces of the preform 130 as shown in FIG. 6B. In doing so, the maxima surfaces 172 are formed at a height that is greater than the minima surfaces 170 by distance $H_p$ on both the top and bottom sides. The maxima surfaces 172 are formed near the corners or opposite ends on both the top and bottom sides. The minima surfaces 170 are formed between the opposite ends. The preform 130 is then placed into the draw furnace and used to draw the bare multicore fiber 110 shown in FIG. 6. The multicore fiber 110 may also be coated.

Referring to FIG. 7, a bare multicore fiber 110 is shown having a plurality of maxima and minima surface structures 162 and 160, respectively, for a two-dimensional core array embodiment. In this embodiment, a two-dimensional N×M array of sixteen glass cores 112 are shown surrounded by cladding 114. The multicore fiber 110 is generally rectangular shaped having four side walls defining a rectangular or square shape and has somewhat rounded corners. Each of the four walls has maxima surfaces 162 formed near the corners or ends and minima surfaces 160 between the maxima surfaces 162. The maxima surfaces 162 have a height greater than the minima surfaces 160 by a distance $H_f$. As such, the maxima surfaces 162 serve as standoffs to allow for orientation and alignment of the multicore fiber 110 with a connecting device so that the core 112 align with the light communication paths. It should be appreciated that the multicore fiber 110 may have one or more side walls which include the maxima surfaces 162 for alignment purposes, but in this example all four side walls are configured as such.

Figure 7A:
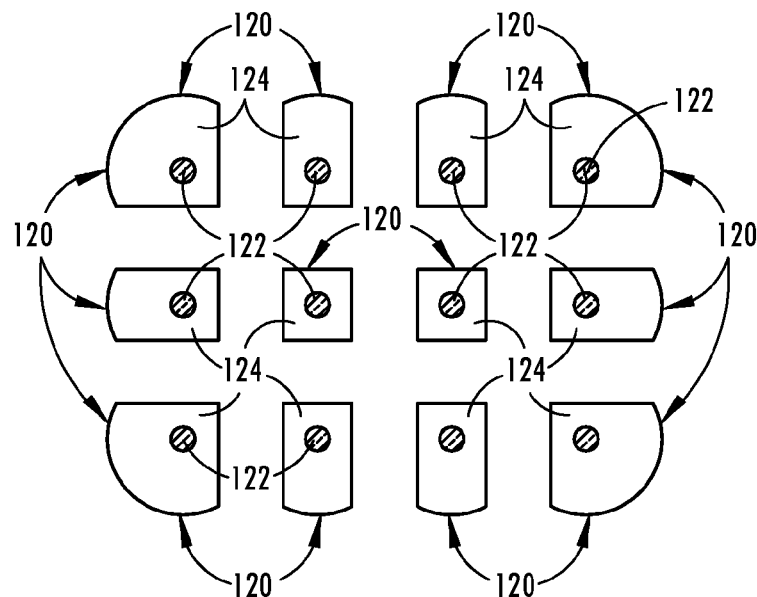
FIG. 7A is an exploded end view of a preform used to form the multicore fiber of FIG. 7 showing the machined canes and the assembly thereof.
Figure 7B:
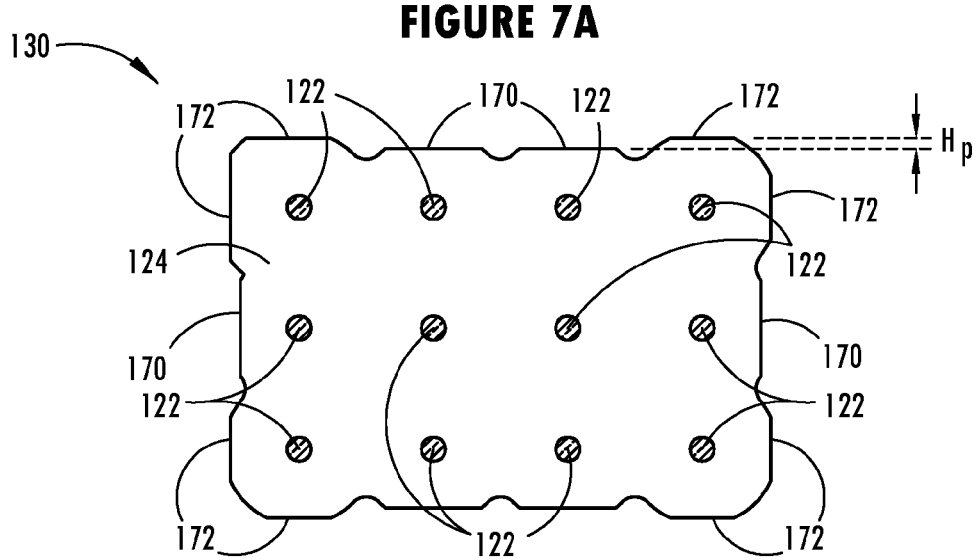
FIG. 7B is an end view of the preform of FIG. 7A further showing maxima and minima surfaces.

The formation of a preform 130 that is used to form the multicore fiber 110 of FIG. 7 is illustrated in FIGS. 7A and 7B. The preform 130 is formed by starting with a plurality of starting canes 120 that may be cylindrical and may be machined to include one or more flat surfaces. In the example shown, the four corner canes are each formed having two flat surfaces, while the remaining canes 120 are formed having three or four flat surfaces as shown. The machined canes 120 are then aligned and assembled together and consolidated to form a preform. The preform 130 is then machined to form the flat surfaces on the side walls which include the maxima surfaces 172 and minima surfaces 170 as shown in FIG. 7B. The maxima surfaces 172 have a height greater than the minima surfaces 170 by a distance $H_p$. The preform 130 is then placed in the draw furnace and used to draw the multicore fiber 110 shown in FIG. 7. As can be seen, the resulting shape of the multicore fiber 110 including the maxima and minima surfaces and the corners or ends are substantially the same as the shape of the preform shown in FIG. 7B.

While approximately square or rectangular shaped preforms are shown for drawing like shaped multicore fibers, it should be appreciated that other shapes and sizes may be produced with reference surfaces according to other embodiments.

Referring to FIG. 8, a multicore preform 130' is shown according to yet another embodiment including a plurality of openings 180 which may be used to form a multicore fiber that results in air channels or air holes in the drawn multicore fiber. The openings 180 may be formed by machining openings into adjoining canes during the assembly of the preform 130 such that the resulting shape of the assembled canes results in the shape of the opening 180. Alternatively, the plurality of openings 180 may be formed by drilling holes within the preform. The presence of openings 180 in the multicore fiber that is produced from the preform 130' allows for air channels which may provide for signal isolation.

Various modifications and alterations may be made to the examples within the scope of the claims, and aspects of the different examples may be combined in different ways to achieve further examples. Accordingly, the true scope of the claims is to be understood from the entirety of the present disclosure in view of, but not limited to, the embodiments described herein.

It will be apparent to those skilled in the art that various modifications and variations can be made without departing from the spirit or scope of the claims.

What is claimed is:

1. A method of forming a multicore fiber comprising the steps of:

forming a preform having a plurality of cores and cladding surrounding the cores, wherein the preform has a non-circular cross section with a plurality of corners and a maximum dimension across the cross section of the preform;

inserting the preform in a draw furnace having a substantially circular cross section such that a ratio of the maximum dimension of the preform to an inside diameter of the draw furnace is greater than 0.60; and drawing a multicore fiber from the preform to achieve a reduction in cross-sectional size as the fiber is drawn while substantially maintaining a non-circular cross-sectional shape and the plurality of corners of the preform, wherein the multicore fiber is drawn at a draw speed of $V_{draw}$ from a preform having maximum cross section dimension $D_p$ in a draw furnace having peak temperature in Kelvin of $T_{peak}$ and hot zone length of $L_{draw}$ under conditions that result in non-dimensional draw parameter $X=(L_{draw}\times\sigma)/(V_{draw}\times\mu\times D_p)$ to be less than $5\times10^{-6}$; wherein $\sigma$ is the glass surface tension defined as $\sigma$ (dynes/cm)=$233.28+0.035\times T_{peak}$ and $\mu$ is the glass viscosity defined as $\mu$ (Poise)=$\text{Exp}[-13.738+(60604.7/T_{peak})]$.

2. The method of claim 1, wherein the multicore fiber is drawn under conditions having non-dimensional draw parameter X less than $2\times10^{-6}$.

3. The method of claim 1, wherein the multicore fiber is drawn under conditions having non-dimensional draw parameter X less than $1\times10^{-6}$.

4. The method of claim 1, wherein the ratio of the maximum dimension of the preform to the inside diameter of the draw furnace is greater than 0.80.

5. The method of claim 1, wherein the ratio of the maximum dimension of the preform to the inside diameter of the draw furnace is greater than 0.90.

6. The method of claim 1, wherein the ratio of the maximum dimension of the preform to the inside diameter of the draw furnace is greater than 0.95.

7. The method of claim 1, wherein the fiber has a substantially rectangular cross-sectional shape having four corners, wherein each corner of the fiber has a radius of curvature of less than 1000 microns.

8. The method of claim 7, wherein each corner of the fiber has a radius of curvature of less than 500 microns.

9. The method of claim 7, wherein each corner of the fiber has a radius of curvature of less than 250 microns.

10. A method of forming a multicore fiber comprising the steps of:
    forming a preform having a plurality of cores and cladding surrounding the cores, wherein the preform has a non-circular cross section with a plurality of corners and a maximum dimension across the cross section of the preform;
    inserting the preform in a draw furnace having a substantially circular cross section such that a ratio of the maximum dimension of the preform to an inside diameter of the draw furnace is greater than 0.70; and
    drawing a multicore fiber from the preform to achieve a reduction in cross-sectional size as the fiber is drawn while substantially maintaining a non-circular cross-sectional shape and the plurality of corners of the preform.

11. A method of forming a multicore fiber comprising the steps of:
    forming a preform having a plurality of cores and cladding surrounding the cores, wherein the preform has a non-circular cross section with a plurality of corners and a maximum dimension across the cross section of the preform;
    inserting the preform in a draw furnace having a substantially circular cross section such that a ratio of the maximum dimension of the preform to an inside diameter of the draw furnace is greater than 0.60; and
    drawing a multicore fiber from the preform to achieve a reduction in cross-sectional size as the fiber is drawn while substantially maintaining a non-circular cross-sectional shape and the plurality of corners of the preform, wherein the step of forming the non-circular preform comprises:
    forming a plurality of core canes each having a core surrounded by cladding;
    processing each core cane to include at least one flat lateral surface;
    aligning the flat lateral surface of adjoining canes; and
    consolidating the aligned canes to form the preform.

12. The method of claim 11, wherein the step of processing each core cane comprises machining each core cane to include at least one flat lateral surface.

13. The method of claim 11, wherein the step of processing each core cane to include at least one flat lateral surface comprises processing each core cane to include four flat lateral surfaces.

14. A method of forming a multicore fiber comprising the steps of:
    forming a preform having a plurality of cores and cladding surrounding the cores, wherein the preform has a non-circular cross section with a plurality of corners and a maximum dimension across the cross section of the preform;
    inserting the preform in a draw furnace having a substantially circular cross section such that a ratio of the maximum dimension of the preform to an inside diameter of the draw furnace is greater than 0.60; and
    drawing a multicore fiber from the preform to achieve a reduction in cross-sectional size as the fiber is drawn while substantially maintaining a non-circular cross-sectional shape and the plurality of corners of the preform, wherein the fiber comprises an enlarged maxima member near each of the corners, and further comprises reduced maxima between adjacent corners so that the enlarged maxima members serve as alignment points.

* * * * *